No. 658,620. Patented Sept. 25, 1900.
L. S. CLARKE & J. G. HEASLET.
DRIVING APPARATUS FOR MOTOR VEHICLES.
(Application filed Feb. 5, 1900.)
(No Model.) 4 Sheets—Sheet 1.
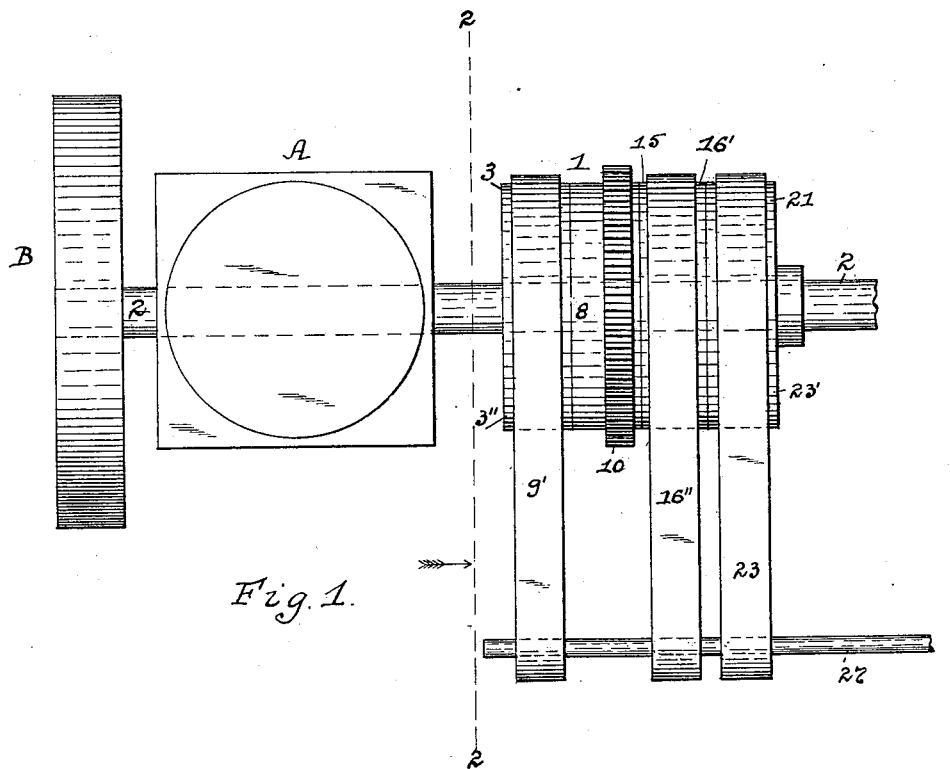
Fig. 1.
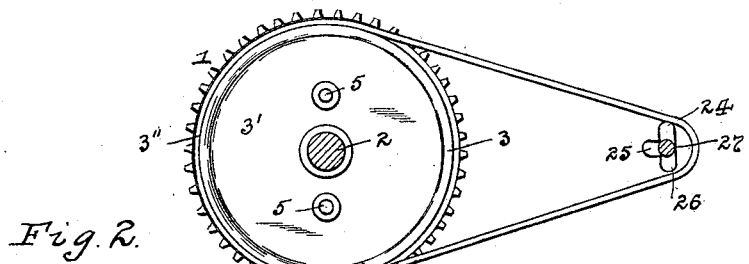
Fig. 2.
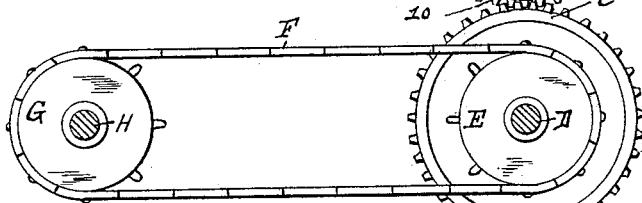
Witnesses:
A. H. Beakley
J. L. Trefaller
Inventors.
Louis S. Clarke.
James G. Heaslet.
By J. N. Cooke,
Attorney.

No. 658,620. Patented Sept. 25, 1900.
L. S. CLARKE & J. G. HEASLET.
DRIVING APPARATUS FOR MOTOR VEHICLES.
(Application filed Feb. 5, 1900.)

(No Model.) 4 Sheets—Sheet 2.

Witnesses:
A. B. Blakley
J. L. Trefaller

Inventors.
Louis S. Clarke
James G. Heaslet.
By J. N. Cooke
Attorney.

No. 658,620. Patented Sept. 25, 1900.
L. S. CLARKE & J. G. HEASLET.
DRIVING APPARATUS FOR MOTOR VEHICLES.
(Application filed Feb. 5, 1900.)
(No Model.)  4 Sheets—Sheet 3.
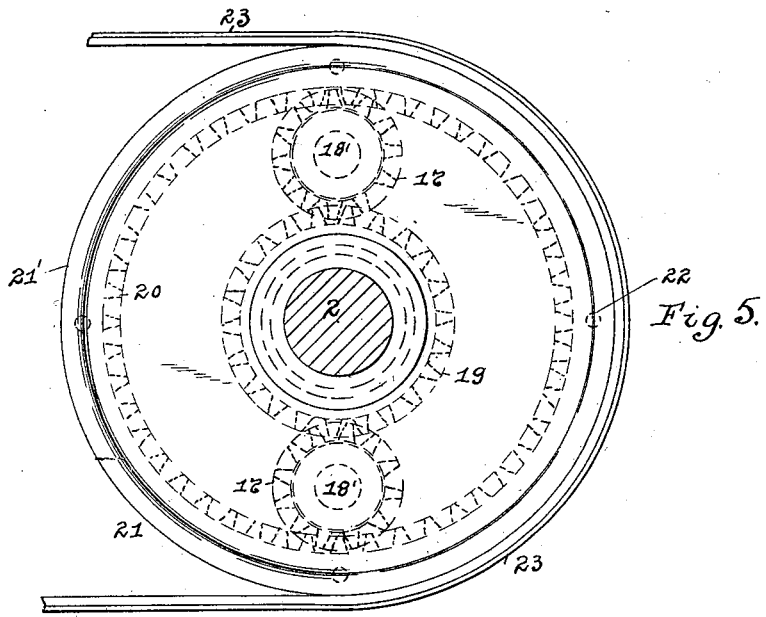
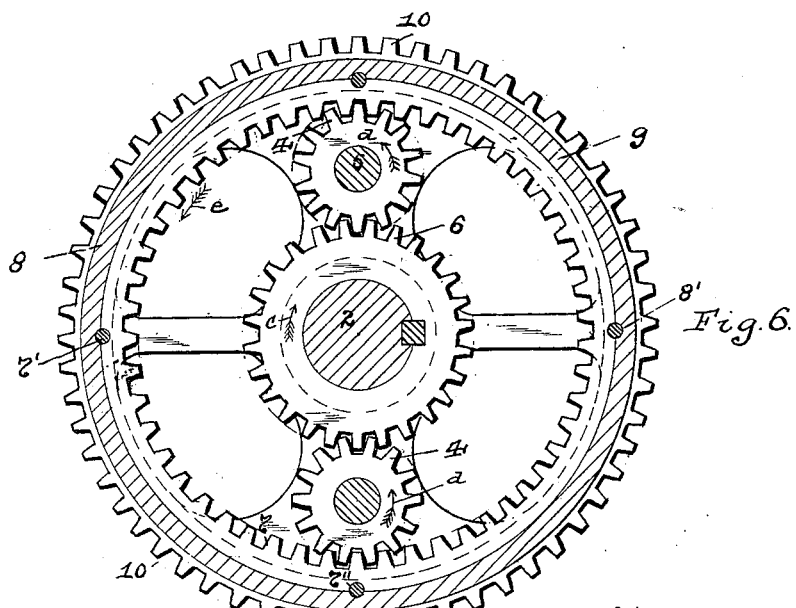
Witnesses:  Inventors.

No. 658,620. Patented Sept. 25, 1900.
L. S. CLARKE & J. G. HEASLET.
DRIVING APPARATUS FOR MOTOR VEHICLES.
(Application filed Feb. 5, 1900.)

(No Model.) 4 Sheets—Sheet 4.

UNITED STATES PATENT OFFICE.

LOUIS S. CLARKE, OF PITTSBURG, AND JAMES G. HEASLET, OF ALLEGHENY, PENNSYLVANIA, ASSIGNORS TO THE AUTOCAR COMPANY, OF PITTSBURG, PENNSYLVANIA.

DRIVING APPARATUS FOR MOTOR-VEHICLES.

SPECIFICATION forming part of Letters Patent No. 658,620, dated September 25, 1900.

Application filed February 5, 1900. Serial No. 3,974. (No model.)

*To all whom it may concern:*

Be it known that we, LOUIS S. CLARKE, a resident of Pittsburg, and JAMES G. HEASLET, a resident of Allegheny, in the county of Allegheny and State of Pennsylvania, have invented a new and useful Improvement in Driving Apparatus for Motor-Vehicles, &c.; and we do hereby declare the following to be a full, clear, and exact description thereof.
Our invention relates to driving apparatus, and has special reference to such apparatus for use in connection with motor-vehicles, although it will be evident that such apparatus can be used for operating other objects, if desired.

The main object of our invention is to provide a driving apparatus by applying power-transmission mechanism to a shaft in order to get variable and reversible speeds and movements of the parts composing the same.

Our invention consists, generally stated, in the novel arrangement, construction, and combination of parts, as hereinafter more specifically set forth and described, and particularly pointed out in the claims.

To enable others skilled in the art to which our invention appertains to construct and use the driving apparatus, we will describe the same more fully, referring to the accompanying drawings, in which—

Figure 3:
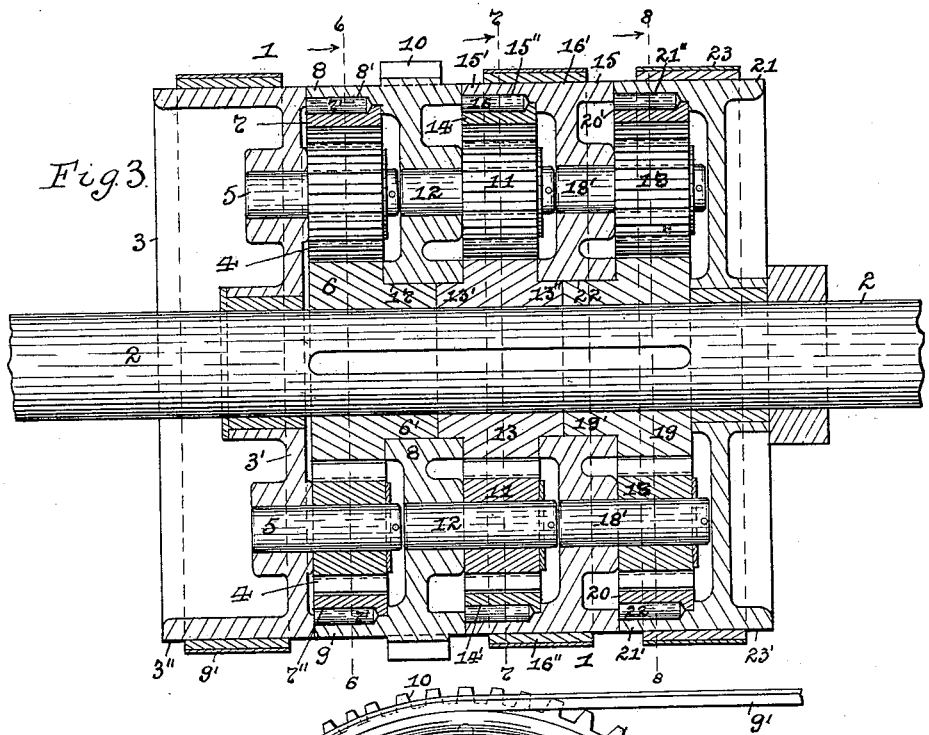
Figure 4:
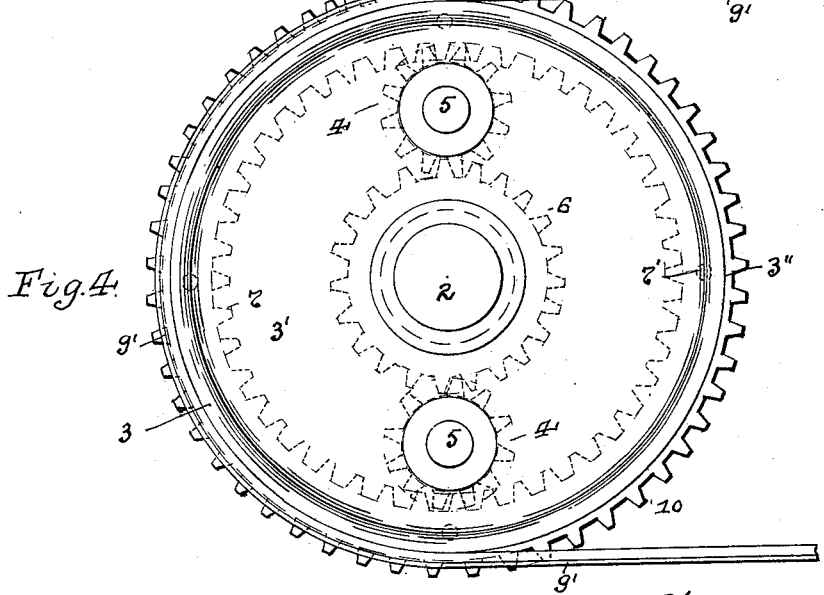
Figure 7:
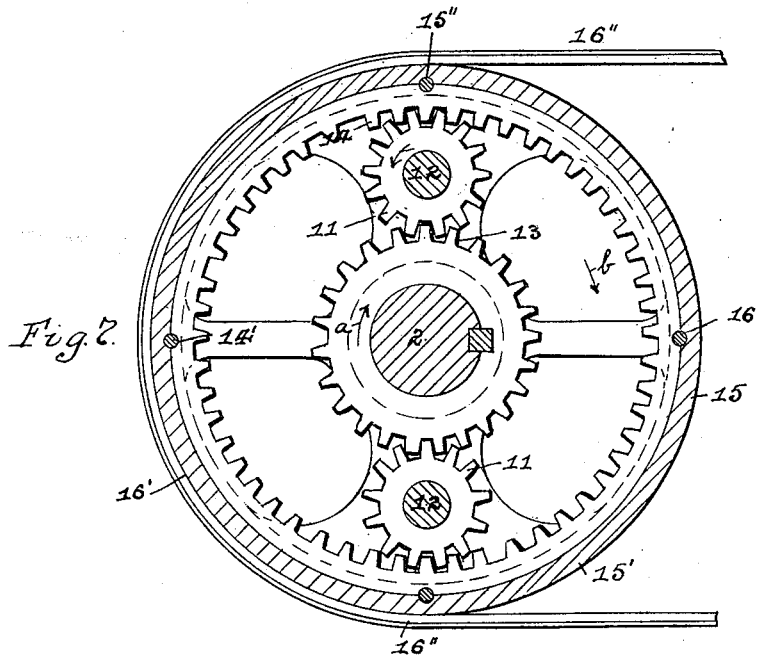
Figure 8:
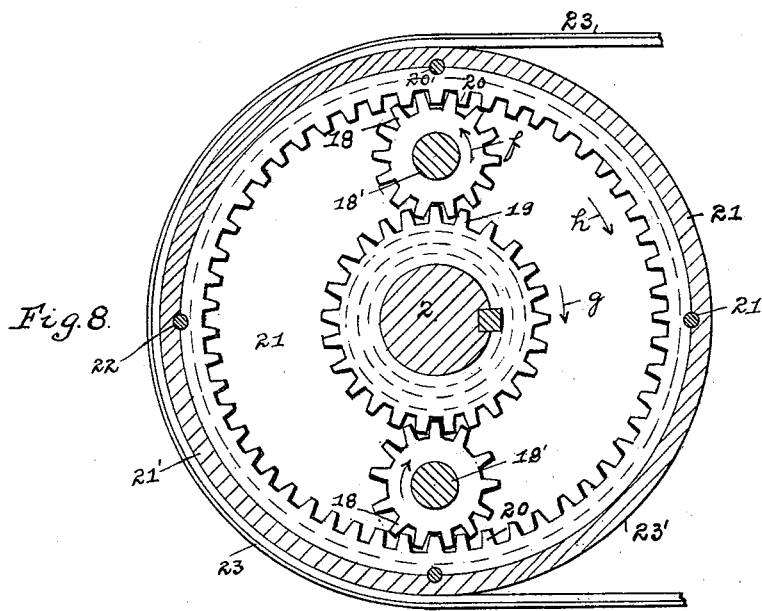

Figure 1 is a plan or elevation of our improved driving apparatus, showing the same connected to an engine or motor and ready to be operated. Fig. 2 is a cross-section on the line 2 2, Fig. 1, showing the apparatus connected to the driving-axle of a motor-vehicle. Fig. 3 is a longitudinal section of the driving apparatus. Fig. 4 is a plan view looking at one end of the same. Fig. 5 is a like view looking at the opposite end of the same. Fig. 6 is a transverse section of the driving apparatus on the line 6 6, Fig. 3, and looking in the direction of the arrow. Fig. 7 is a like view on the line 7 7, Fig. 3, looking in the direction of the arrow; and Fig. 8 is a like view on the line 8 8, Fig. 3, looking in the direction of the arrow.

Like characters herein indicate like parts in each of the figures of the drawings.

The driving apparatus shown and described herein is capable of various and different uses for various and different objects and purposes, and in the present case it is represented as means for effecting movements of various speeds of a device which may be of any character, but which is represented for convenience as applied to parts for operating a motor-vehicle.

In Fig. 1 the driving apparatus is shown as applied to a shaft 2, which is journaled in suitable bearings on a motor-vehicle, and to which shaft an engine or motor A is connected for driving the same, said shaft 2 having a fly-wheel B mounted thereon and being adapted to move in the same direction at all times. The driving apparatus 1 is provided with the disk or member 3, which is loosely mounted around said shaft 2 and carries two pinions 4, located at equidistant points from the axis of motion of the shaft 2 and carried by journals 5, mounted in the web 3' of the disk 3. The pinions 4 mesh with a third and larger pinion 6, keyed to the shaft 2, and also with an internal ring-gear or circular rack 7 on the power-transmitting member 8. This rack 7 is secured to the flange 9 of the member 8 by means of pins 7', which fit within seats 7" and 8', formed in the rack 7 and flange 9, and the outer surface or periphery 3" of said disk 3 is adapted to receive a strap or band 9' for holding said disk 3. The member 8 is provided with a gear-face 10 on its periphery, which is connected to and meshes with another gear-wheel C, mounted on a counter-shaft D, on which is a sprocket-wheel E, around which passes a sprocket-chain F, and in turn the chain passes over a sprocket-wheel G, located on the rear axle H of the vehicle, and it is evident that other means transmitting power may be employed with the member 8. The member 8 carries two pinions 11, which are located at similar distances from the axes of the shaft 2 as the pinions 4 and are mounted on journals 12, carried on the member 8. The pinions 11 mesh with a third and large pinion 13, keyed to the shaft 2, and in turn meshes with an internal ring-gear or circular rack 14 on the disk 15, and said rack 14 is secured to the flange 15' of the disk 15 by means of pins 16, which fit within seats 14' and 15", formed in the rack 14 and flange 15'. The outer surface or periphery 16' of the disk 15 is provided with a strap or band 16" for holding said disk 15 when required in the operations. The pinions 6 and 13 are provided with hubs 6' and 13', which extend out on one side thereof around the shaft 2, so as to meet and form the depressions or seats 17, and within which is loosely mounted the member 8. The disk 15 carries two pinions 18, which are located at similar distances from the axis of the shaft 2 as the pinions 4 and 11 and are mounted on journals 18', carried by the disk 15, and these pinions 18 mesh with a third and larger pinion 19, keyed to the shaft 2, and in turn mesh with an internal ring-gear or circular rack 20 on the disk 21, loosely mounted around the shaft 2. The rack 20 is secured to the flange 21' of the disk 21 by means of pins 22, which fit within seats 20' and 21" on the rack 20 and disk 21. The pinions 13 and 19 are provided with hubs 13" and 19', which extend out on one side thereof around the shaft 2, so as to meet and form the depressions or seats 22, within which the disk 15 is loosely mounted. The disk 21 is provided with a strap or band 23 on its periphery 23' for holding said disk 21 when desired in the operations.

From the preceding description of the parts of our improved driving apparatus it will be apparent that when the disks 3, 15, and 21 are free from any restraining influences the power-transmitting member 8 of the apparatus is not operated or in motion; but when either of said disks 3, 15, or 21 is blocked the different speeds and reversing of the member 8 will follow in accordance with the element or disk 3, 15, or 21 that is limited, and when the vehicle is standing still with the engine going ahead the different elements 3, 15, and 21 are free to rotate while the element 8 is still.

For convenience in describing the operation of the driving apparatus we will designate the disk 3 as the "reverse-drum," the member 8 as the "gear-drum," the disk 15 the "slow-ahead drum," and the disk 21 the "fast-ahead drum." Let it be assumed that the friction brake-band 16" around the periphery 16' of the drum 15 is thrown into action, which will cause the drum 15 to be held or prevented from rotating, and the shaft 2 and gear 13 will move in the direction of the arrow $a$, (shown in Fig. 7,) and as the said drum 15 is blocked the internal circular gear 14 will also be held from rotating, so that by reason of the intermeshing of the teeth of the gears 13 and 14 with the intermediate pinions 11 these pinions 11 will be caused to travel orbitally around the shaft 2 in the direction of the arrow $b$ in Fig. 7, and the gear-drum 8 will be operated or rotated in the same direction as the pinions 11, so permitting the drum 8 to move slowly forward or ahead in the same direction as the shaft 2. When the friction brake-band 9' around the periphery 3" of the reverse-drum 3 is thrown into action, the drum 3 will be held or prevented from rotating, and consequently will prevent the orbital movement of the two pinions 4 about the shaft 2, which rotates in the direction of the arrow $c$, Fig. 6, the pinion 6 being keyed to said shaft 2, moving in the same direction, and as such pinions 4 are for the time being fixed against rotation they are caused to revolve in the direction of the arrow $d$ in said Fig. 6, and being in mesh with the internal circular rack 7 on the flange 9 of the gear-drum 8 they will cause said drum 8 to rotate in the direction of the arrow $e$, (shown in Fig. 6,) which direction is opposite to the direction of movement of the shaft 2, and so permits the drum 8 to reverse. When the friction-brake 23 around the periphery 23' on the fast drum 21 is thrown into action, the drum 21 will be held or prevented from operating or rotating, and as the pinions 18 are loosely mounted on the journals 18' on the drum 15 the pinions 18 are caused to revolve orbitally in the direction of the arrow $f$ in Fig. 8 on account of being in mesh with the internal circular gear 20 on the drum 21 and with the gear 19, which is keyed to said shaft 2 and is revolved in a corresponding direction, as shown by the arrow $g$ in Fig. 8, while the pinions 18 are caused to revolve on their axes or journals 18' in an opposite direction from the shaft 2. As these journals 18' are mounted upon the drum 15, it causes the slow drum 15 to move in the same direction as the shaft 2, but at a slower speed, and as the drum 15 is thus rotated in the same direction as the shaft 2, the pinions 11 being in mesh with the rack 14 on said drum 15 and with the gear 13 on shaft 2, it will cause the gear-drum 8 to move in the same direction as the shaft 2, but slower than said shaft 2, although faster than the slow drum 15, on account of the orbital movement of the gears 18 in the direction of the shaft 2, as shown by the arrow $h$ in Fig. 8. When the brake-band 16" is applied to drum 15, as above described, it causes the said gear-drum 8 to revolve in the same direction as the shaft 2, but at a less speed than when the brake 23 is applied to the drum 21, as above described, for the reason that in applying brake 23 to drum 21 it causes the drum 15 to revolve in the same direction as the shaft 2, thus giving an increased speed to the journals 12, carrying the pinions 11, in mesh with the rack 14 and gear 13, than when said drum 15 is held stationary, so permitting a variation in the forward speed of the vehicle.

It will be evident that when the brake-band 9' is applied to the reverse-drum 3 and the vehicle is caused to reverse, as above described, the external gear-drum 8 not only runs in a reverse direction from the shaft 2, but also the slow drum 15 and fast drum 21 will revolve in the same direction as the drum 8 on account of the pinion 11 on said drum 8 being in mesh with the gears 13 and 14 on said shaft 2 and drum 15 and also for the reason that the pinions 18 on said drum 15 are in mesh with the gears 19 and 20 on said shaft 2 and drum 21. The brake-bands 9, 16", and 23 in all cases may be applied gently to their respective drums, which will give variable speeds in either direction of the gear-drum 8, and when the brake-band 9' is applied to drum 3 gently, so as to cause a slowing down of the rotation of said drum 3, but not stop it, the said drum 3 can be used as a brake for the vehicle, and the brake-band 16" may be applied gently to the drum 15 and cause the vehicle to stop or brake the vehicle when moving backward.

It will thus be seen that our improved driving apparatus comprises a shaft, three main members or disks 3, 15, and 21, loose thereon, an auxiliary or power-transmitting member 8, also loose upon said shaft, and three independent power-transmitting mechanisms, each including three elements, the three elements of one power-transmitting mechanism being carried, respectively, by said shaft, a main member and the auxiliary member, and the three elements of the other power-transmitting mechanism being carried, respectively, by the shaft and the other main members, and the first elements of each power-transmitting mechanism being fixed to said shaft and the intermediate ones being rotative upon their supports.

It will be obvious that while there is represented herein three independent driving mechanisms, consisting, respectively, of intermeshing trains of gears, other instrumentalities might be employed for securing the differential motions of the member 8, and consequently of the member or part driven thereby, and it will be further understood that any convenient mechanism can be employed for limiting the action of the terminal members, although we prefer to use for simplicity independently-active friction-brakes and each being normally controlled, such as shown in Fig. 1, wherein the straps or bands 9', 16", and 23, which pass around the peripheries of the disks or drums 3, 15, and 21, respectively, are connected to and engage with eccentrics or cams 24, 25, and 26, secured on a rock-shaft 27, which is journaled in suitable bearings on the vehicle and operated by means of a lever or any other suitable means connected thereto, said eccentrics or cams being alternately effective, and the operation is such that by turning the shaft in one direction one of the brakes will be tightened and by turning the shaft still farther in the same direction another brake will be tightened, whereas by turning said shaft in the opposite direction the other brake will be set, whereby the drums 3, 15, and 21 can be rendered effective, and it will of course be understood that when one disk or drum is blocked the others will be released, and vice versa.

It will be further seen that the invention described is not limited to the exact elements specified, for it is obvious that others may be substituted therefor and that other drums and power-transmitting mechanisms can be connected to said drums and shaft in order to make more and other variable speeds of the apparatus than that illustrated, and that the pinions 4, 11, 17, 6, 13, and 19 can be made of different and various diameters, so as to produce variable speeds, while various other changes may also be made in the design and modification of the parts without departing from the spirit of the invention or sacrificing any of its advantages. It will also be understood that the term "shaft" is a generic one and includes within its meaning any and all structures capable of coöperation with three independent sets of driving mechanisms and that when neither of the brakes 9', 16", and 23 is blocked or set the drums 3, 15, and 12 will be operated at will, and these motions will not be transmitted to the drum 8, which will be held from operating by the resistance imposed thereon from the gear-wheel engaging therewith.

What we claim as our invention, and desire to secure by Letters Patent, is—

1. In a driving apparatus, a shaft, three main members loosely mounted around said shaft, an auxiliary member also loosely mounted around said shaft, and three independent power-transmitting mechanisms each including three elements, the three elements of two power-transmitting mechanisms being carried respectively by said shaft, two main members and the auxiliary member, and the three elements of the other power-transmitting mechanism being carried respectively by the shaft and the other main member, and the first elements of each power-transmitting mechanism being fixed to said shaft and the intermediate ones being rotative upon their supports, and means connected to said main members for holding the same.

2. In a driving apparatus, a shaft, three main members loosely mounted around said shaft, an auxiliary member also loosely mounted around said shaft, and three independent power-transmitting mechanisms each including three elements, the three elements of two power-transmitting mechanisms being carried respectively by said shaft, two main members and the auxiliary member, and the three elements of the other power-transmitting mechanism being carried respectively by the shaft and the other main member, and the first elements of each power-transmitting mechanism being fixed to said shaft and the intermediate ones being rotative upon their supports, and means for alternately limiting the motion of the main members.

3. In a driving apparatus, a shaft, three main members loosely mounted around said shaft, an auxiliary member also loosely mounted around said shaft and three independent power-transmitting mechanisms each including three elements, the three elements of two power-transmitting mechanisms being carried respectively by said shaft, two main members and the auxiliary member, and the three elements of the other power-transmitting mechanism being carried respectively by the shaft and the other main member; and the first elements of each power-transmitting mechanism being fixed to said shaft, and the intermediate ones being rotative upon their supports, three brake-bands located to peripherally engage said main members, and means for alternately operating said brake-bands.

4. In a driving apparatus, a shaft, three main members loosely mounted on said shaft, an auxiliary member loosely mounted upon said shaft between two of the main members, and three independent trains of intermeshing gears, the first member of each train of said gears being keyed to said shaft, and the other members of said trains of gears being carried respectively by said auxiliary member and the main members, and means connected to said main members for holding the same.

5. In a driving apparatus, a shaft, three main members loosely mounted around said shaft and two of them having an annular gear, an auxiliary or intermediate member loosely mounted around said shaft and located between two of said main members, said auxiliary or intermediate member being provided with an annular gear, three gears meshing respectively with said annular gears, one of them being rotatively carried by said auxiliary or intermediate member, the other ones being rotatively carried by the main members, and gears meshing with said rotatively-carried gears and fixed to said shaft, and means connected to said main members for holding the same.

6. In a driving apparatus, a shaft, three main members loosely mounted around said shaft, two of said members being provided with an inturned annular flange having upon their inside faces an annular gear, an auxiliary member intermediate of two of said members loosely mounted around said shaft and provided with an inturned annular flange having an annular gear upon its inside face, three gears rotatively carried respectively by the auxiliary or intermediate member and by two of the main members and meshing with said annular gears, and gears fixed to said shaft and meshing with said rotatively-carried gears, and means connected to said main members for holding the same.

7. In a driving apparatus, a shaft, three main members loosely mounted around said shaft, two of said members being provided with an inturned annular flange having upon their inside faces an annular gear, an auxiliary member intermediate of two of said members loosely mounted around said shaft and provided with an inturned annular flange having an annular gear upon its inside face, three gears rotatively carried respectively by the auxiliary or intermediate member and by two of the main members and meshing with said annular gears, gears fixed to said shaft and meshing with said rotatively-carried gears, and an annular gear on the face of said auxiliary or intermediate member adapted to mesh with a gear on another or counter shaft, and means connected to said main members for holding the same.

8. In a driving apparatus, a shaft, three main members loosely mounted around said shaft, two of said members being provided with an inturned annular flange having upon their inside faces an annular gear, an auxiliary member intermediate of two of said members loosely mounted around said shaft and provided with an inturned annular flange having an annular gear upon its inside face, three gears rotatively carried respectively by the auxiliary or intermediate member and by two of the main members and meshing with said annular gears, gears fixed to said shaft and meshing with said rotatively-carried gears, an annular gear on the face of said auxiliary or intermediate member adapted to mesh with a gear on another or counter shaft, and a sprocket-wheel on said counter-shaft having a sprocket-chain passing over the same and over a sprocket-wheel on a driven shaft to operate the driven shaft, and means connected to said main members for holding the same.

In testimony whereof we, the said LOUIS S. CLARKE and JAMES G. HEASLET, have hereunto set our hands.

LOUIS S. CLARKE.
JAMES G. HEASLET.

Witnesses:
WILLIAM MORGAN,
J. N. COOKE.